United States Patent
Takahashi

(10) Patent No.: US 7,236,627 B2
(45) Date of Patent: Jun. 26, 2007

(54) IMAGE SENSING APPARATUS AND METHOD, PROGRAM, AND STORAGE MEDIUM

(75) Inventor: Kenji Takahashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 10/613,733

(22) Filed: Jul. 2, 2003

(65) Prior Publication Data

US 2004/0012691 A1 Jan. 22, 2004

(30) Foreign Application Priority Data

Jul. 4, 2002 (JP) ............... 2002-195787

(51) Int. Cl.
*G06K 9/00* (2006.01)
*H04N 9/73* (2006.01)
*H04N 9/68* (2006.01)
*H04N 3/14* (2006.01)
*H04N 5/335* (2006.01)
*H04N 9/04* (2006.01)
*H04N 9/083* (2006.01)
*H04N 1/46* (2006.01)
*G03F 3/08* (2006.01)

(52) U.S. Cl. ............ 382/162; 348/223.1; 348/237; 348/273; 358/500; 358/516; 358/518

(58) Field of Classification Search ........ 382/162–167; 348/21.99, 222.1, 223.1, 225.1, 237, 272–280; 358/500, 515–523
See application file for complete search history.

(56) References Cited

U.S. PATENT DOCUMENTS

| 4,745,467 A | * | 5/1988 | Sekizawa et al. | ............ 358/523 |
| 5,198,890 A | * | 3/1993 | Suga | ............ 348/227.1 |
| 5,202,756 A | * | 4/1993 | Sasaki et al. | ............ 348/279 |
| 5,253,046 A | * | 10/1993 | Shiraishi | ............ 348/237 |
| 5,920,358 A | * | 7/1999 | Takemura | ............ 382/162 |
| 6,229,916 B1 | * | 5/2001 | Ohkubo | ............ 382/167 |
| 6,281,932 B1 | * | 8/2001 | Fukatsu et al. | ............ 348/279 |
| 6,650,365 B1 | * | 11/2003 | Sato | ............ 348/231.3 |

FOREIGN PATENT DOCUMENTS

| EP | 0891077 | 1/1999 |
| EP | 1139653 | 10/2001 |
| JP | 07-203228 | 8/1995 |
| JP | 8-9241 | 1/1996 |
| JP | 2001-346218 | 12/2001 |
| JP | 2002-152541 | 5/2002 |

OTHER PUBLICATIONS

European Search Report dated Mar. 23, 2007 and issued for European counter-part application No. 03254147.6 - 1228.
Patent Abstracts of Japan for 07-203228.
Patent Abstracts of Japan for 2001-346218.
Patent Abstracts of Japan for 2002-152541.
Japanese Office Action dated Aug. 12, 2005 of corresponding Japanese Patent Application No. 2002-195787.

* cited by examiner

*Primary Examiner*—Bhavesh M Mehta
*Assistant Examiner*—Manav Seth
(74) *Attorney, Agent, or Firm*—Morgan & Finnegan LLP

(57) ABSTRACT

The object of this invention is to decrease a memory capacity required for a lookup table. To achieve this object, in an image sensing apparatus which causes an image processing section to execute image processing to convert digital image data, which is obtained by A/D-converting the output from an image sensing element, into output image data, the image processing section includes a matrix arithmetic processing section and an N-dimensional (N is a positive integer) lookup table arithmetic processing section. The image processing section causes the matrix arithmetic processing section to process the digital image data before the N-dimensional lookup table arithmetic processing section.

17 Claims, 4 Drawing Sheets

FIG. 3

| R | G1 | R | G1 | R | G1 |
|---|----|---|----|---|----|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

IMAGE SENSING APPARATUS AND METHOD, PROGRAM, AND STORAGE MEDIUM

FIELD OF THE INVENTION

The present invention relates to an image sensing apparatus having a lookup table arithmetic processing section, and a method, a program, and a storage medium therefor.

BACKGROUND OF THE INVENTION

In recent years, to improve color reproduction of an image sensed by an image sensing apparatus such as a digital camera, more complex image processing is used to convert image data, which is obtained by A/D-converting an image from a CCD, into a final output image. Examples of the image processing are color conversion processing corresponding to chromatic adaptation as a human color perception characteristic and color conversion processing for converting a color into a memory color that is felt by humans as desirable.

The present applicant has developed a processing method using a three-dimensional lookup table for the above image processing. However, in the color conversion processing corresponding to chromatic adaptation, to change color reproduction in accordance with a change in photographing light source (color temperature), three-dimensional lookup table data equal in number to light sources corresponding to photographing light sources (color temperatures) must be held, as shown in, e.g., FIG. 4 of Japanese Patent Laid-Open No. 8-9241. However, the size of the three-dimensional lookup table data is very large. To hold a plurality of three-dimensional lookup table data, the memory capacity in the image sensing apparatus must be increased. To hold three-dimensional lookup table data equal in number to light sources is not realistic from the viewpoint of cost. There is another method in which three-dimensional lookup table data equal in number to a minimum number of light source color temperatures are held, and at the time of photographing, interpolation arithmetic processing corresponding to the light source color temperature at that time is executed using the three-dimensional lookup table to create three-dimensional lookup table data corresponding to the light source color temperature. However, the less the number of three-dimensional lookup tables becomes, the lower the color conversion accuracy becomes. In addition, since at least two three-dimensional lookup tables are still necessary, the memory capacity must also be increased.

SUMMARY OF THE INVENTION

The present invention has therefore been made in consideration of the above-described problems, and has as its object to decrease the memory capacity required for a lookup table.

In order to solve the above-described problems and achieve the object, according to the first aspect of the present invention, there is provided an image sensing apparatus which causes an image processing section to execute image processing to convert digital image data, which is obtained by A/D-converting an output from an image sensing element, into output image data, wherein the image processing section comprises a matrix arithmetic processing section and an N-dimensional (N is a positive integer) lookup table arithmetic processing section and causes the matrix arithmetic processing section to process the digital image data before the N-dimensional lookup table arithmetic processing section.

According to the second aspect of the present invention, there is provided an image sensing apparatus which has an image sensing element and an A/D conversion section which A/D-converts an output from the image sensing element, causes an image processing section to execute image processing to convert digital image data obtained from the A/D conversion section into output image data, and records the output image data in a recording medium, wherein the image processing section comprises a white balance processing section, a matrix arithmetic processing section, and an N-dimensional lookup table arithmetic processing section where N is an integer not less than 3 and causes the matrix arithmetic processing section to process the digital image data before the N-dimensional lookup table arithmetic processing section.

According to the third aspect of the present invention, there is provided an image sensing method which comprises an image processing step of sensing an image of an object with an image sensing element and an A/D conversion processing step of A/D-converting an output from the image sensing step, and executes image processing in an image processing step to convert digital image data obtained in the A/D conversion processing step into output image data, wherein the image processing step comprises a matrix arithmetic processing step and an N-dimensional (N is a positive integer) lookup table arithmetic processing step and processes the digital image data in the matrix arithmetic processing step before the N-dimensional lookup table arithmetic processing step.

According to the fourth aspect of the present invention, there is provided a program causing a computer to execute the above image sensing method.

According to the fifth aspect of the present invention, there is provided a computer-readable storage medium storing the above program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram showing a digital signal after A/D conversion; and

DETAILED DESCRIPTION OF THE PREFERRED EMBODIMENT

A preferred embodiment of the present invention will be described below in detail with reference to the accompanying drawings.

Figure 1:
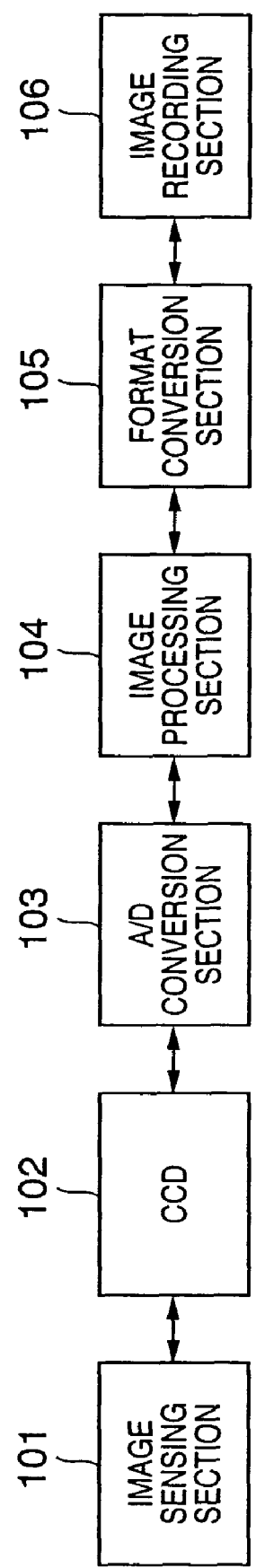
FIG. 1 is a block diagram showing the schematic arrangement of an image sensing apparatus according to an embodiment of the present invention.

FIG. 1 is a block diagram showing the schematic arrangement of an image sensing apparatus according to an embodiment of the present invention.

An image sensing section 101 including a lens system, stop, and shutter forms the image of an object on an image sensing surface of a CCD 102. The object image formed on the CCD 102 is photoelectrically converted into an analog signal. The analog signal is sent to an A/D conversion section 103 and converted into a digital image signal. The digital image signal generated by the A/D conversion section 103 is sent to an image processing section 104 and converted into an output image signal. The output image signal undergoes format conversion in a format conversion section 105 to obtain a JPEG format or the like. Then, the image signal is written in the internal memory of the image sensing apparatus or an external memory such as a compact flash memory (registered trademark) by an image recording section 106. The flow of data in the image sensing apparatus has been briefly described above.

The image processing section 104 will be described in more detail.

Figure 2:
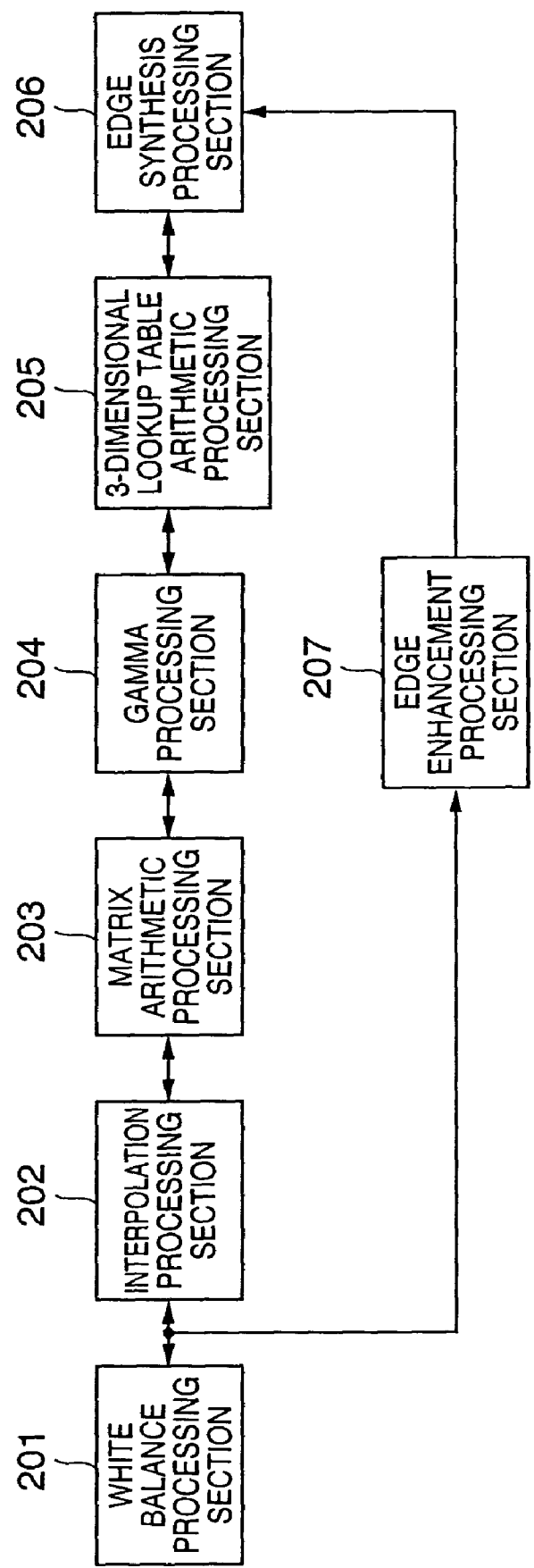
FIG. 2 is a block diagram showing the arrangement of an image processing section.

FIG. 2 is a block diagram showing processing sections included in the image processing section 104 in FIG. 1. The flow of image processing in the image sensing apparatus according to this embodiment will be described below with reference to the block diagram shown in FIG. 2.

Figure 4:
FIG. 4 is a diagram showing a digital image signal after interpolation processing.

The digital image signal output from the A/D conversion section 103 shown in FIG. 1 is sent to a white balance processing section 201 shown in FIG. 2. The color temperature of the light source is detected from the digital image signal, and a white balance coefficient that represents white in the image as a write signal is obtained. The gain of the digital image signal is adjusted using the obtained white balance coefficient. The digital image signal that has undergone the white balance processing is sent to an edge enhancement processing section 207 and interpolation processing section 202. In the interpolation processing section 202, interpolation arithmetic processing is performed using pixels at positions R, G1, G2, and B in the pixel layout of a single-CCD as shown in FIG. 3, thereby creating surface data for R, G1, G2, and B as shown in FIG. 4.

As is known, chromatic adaptation as a human color perception characteristic changes depending on the color temperature. For example, under evening glow or an incandescent lamp, the human eye cannot completely adapt and recognizes a white object as not write but a color with an orange tone. To cope with such chromatic adaptation of the human eye (to cope with a change in color reproduction due to a change in light source color temperature), a matrix arithmetic processing section 203 determines a matrix coefficient to be used for matrix arithmetic processing on the basis of the light source color temperature obtained by the white balance processing section 201 and executes a matrix arithmetic operation. The matrix arithmetic processing is executed for each pixel using:

$$\begin{vmatrix} Rm \\ Gm \\ Bm \end{vmatrix} = \begin{vmatrix} M11 & M21 & M31 & M41 \\ M12 & M22 & M32 & M42 \\ M13 & M23 & M33 & M43 \end{vmatrix} \begin{vmatrix} R \\ G1 \\ G2 \\ B \end{vmatrix} \quad \text{Equation (1)}$$

How to obtain the matrix coefficient will briefly be described below.

Matrix coefficients corresponding to color temperatures, i.e., a matrix coefficient MTX3K for a light source color temperature of 3,000 K or less, a matrix coefficient MTX4K for 4,000 K, a matrix coefficient MTX5K for 5,000 K, a matrix coefficient MTX6K for 6,000 K, and a matrix coefficient MTX7K for 7,000 K or more are prepared in advance in the matrix arithmetic processing section. Here, a matrix coefficient MTX for a light source color temperature of 5,300 K should be obtained. First, the matrix coefficients of the upper and lower light source color temperature levels are selected. In this case, the matrix coefficient MTX5K for 5,000 K and the matrix coefficient MTX6K for 6,000 K are selected. The matrix coefficient corresponding to the light source is obtained using the selected matrix coefficients in accordance with:

$$MTX = (5300-5000)/1000 \times MTX5K + (6000-5300)/1000 \times MTX6K \quad \text{Equation (2)}$$

However, when the color temperature of the light source is 3,000 K or less, $$MTX = MTX3K \quad \text{Equation (3)}$$

When the color temperature of the light source is 7,000 K or more, $$MTX = MTX7K \quad \text{Equation (4)}$$

The digital image signal that has undergone the matrix arithmetic processing is sent to a gamma processing section 204. The gamma processing section 204 converts the data using:

$$Rg = \text{GammaTable}[Rm] \quad \text{Equation (5)}$$

$$Gg = \text{GammaTable}[Gm] \quad \text{Equation (6)}$$

$$Bg = \text{GammaTable}[Bm] \quad \text{Equation (7)}$$

where GammaTable represents a one-dimensional lookup table.

The digital image signal that has undergone the gamma processing is sent to a three-dimensional lookup table arithmetic processing section 205.

The three-dimensional lookup table arithmetic processing will be described below. The three-dimensional lookup table arithmetic processing according to this embodiment converts three-dimensional data of R, G, and B from R, G, and B signals that have undergone the matrix processing into R, G, and B signals that take memory color reproduction into consideration. More specifically, R, G, and B signals are converted into colors that are memorized by humans as desirable colors. For example, a blue sky is converted from blue into blue green, grass is converted from yellowish green into green, and a skin is converted into a more pinkish flesh color. In this embodiment, to decrease the capacity of the three-dimensional lookup table, the minimum to maximum values of the R, G, and B signals are divided into nine parts to prepare 9×9×9=729 three-dimensional representative lattice points. R, G, and B signals other than the representative lattice points are obtained by interpolation. Interpolation is performed on the basis of the equations given below. Since the image data undergoes the matrix arithmetic in advance in accordance with the color temperature, it is unnecessary to prepare a three-dimensional lookup table corresponding to each color temperature.

Let R, G, and B be the input R, G, and B signals, Rout(R,G,B), Gout(R,G,B), and Bout(R,G,B) be output R, G, and B signals, Ri, Gi, and Bi be the signals at representative lattice points having values which are smaller than and closest to the signal values, Rout(Ri,Gi,Bi), Gout(Ri,Gi,Bi), and Bout(Ri,Gi,Bi) be the representative lattice point output signals, and Step be the step width of the representative lattice points. Then, we have $$R = Ri + Rf$$
$$G = Gi + Gf$$
$$B = Bi + Bf$$

Equation (8)
$$\begin{aligned}
Rout(R, G, B) = {} & Rout(Ri+Rf, Gi+Gf, Bi+Bf) = (Rout(Ri, Gi, Bi) \times \\
& (Step-Rf) \times (Step-Gf) \times (Step-Bf) + \\
& Rout(Ri+Step, Gi, Bi) \times (Rf) \times (Step-Gf) \times \\
& (Step-Bf) + Rout(Ri, Gi, +Step, Bi) \times \\
& (Rf) \times (Step-Gf) \times (Step-Bf) + \\
& Rout(Ri, Gi+Step, Bi) \times (Step-Rf) \times (Gf) \times \\
& (Step-Bf) + Rout(Ri, Gi, Bi+Step) \times \\
& (Step-Rf) \times (Step-Gf) \times (Bf) + \\
& Rout(Ri+Step, Gi+Step, Bi) \times (Rf) \times (Gf) \times \\
& (Step-Bf) + Rout(Ri+Step, Gi, Bi+Step) \times \\
& (Rf) \times (Step-Gf) \times (Bf) + \\
& Rout(Ri, Gi+Step, Bi+Step) \times \\
& (Step-Rf) \times (Gf) \times (Bf) + \\
& Rout(Ri+Step, Gi+Step, Bi+Step) \times \\
& (Rf) \times (Gf) \times (Bf))/(Step \times Step \times Step)
\end{aligned}$$

Equation (9)
$$\begin{aligned}
Gout(R, G, B) = {} & Gout(Ri+Rf, Gi+Gf, Bi+Bf) = \\
& (Gout(Ri, Gi, Bi) \times (Step-Rf) \times (Step-Gf) \times \\
& (Step-Bf) + Gout(Ri+Step, Gi, Bi) \times \\
& (Rf) \times (Step-Gf) \times (Step-Bf) + \\
& Gout(Ri, Gi+Step, Bi) \times (Step-Rf) \times (Gf) \times \\
& (Step-Bf) + Gout(Ri, Gi, Bi+Step) \times \\
& (Step-Rf) \times (Step-Gf) \times (Bf) + \\
& Gout(Ri+Step, Gi+Step, Bi) \times (Rf) \times (Gf) \times \\
& (Step-Bf) + Gout(Ri+Step, Gi, Bi+Step) \times \\
& (Rf) \times (Step-Gf) \times (Bf) + \\
& Gout(Ri, Gi+Step, Bi+Step) \times \\
& (Step-Rf) \times (Gf) \times (Bf) + \\
& Gout(Ri+Step, Gi+Step, Bi+Step) \times \\
& (Rf) \times (Gf) \times (Bf))/(Step \times Step \times Step)
\end{aligned}$$

Equation (10)
$$\begin{aligned}
Bout(R, G, B) = {} & Bout(Ri+Rf, Gi+Gf, Bi+Bf) = \\
& (Bout(Ri, Gi, Bi) \times (Step-Rf) \times (Step-Gf) \times \\
& (Step-Bf) + Bout(Ri+Step, Gi, Bi) \times \\
& (Rf) \times (Step-Gf) \times (Step-Bf) + \\
& Bout(Ri, Gi+Step, Bi) \times (Step-Rf) \times (Gf) \times \\
& (Step-Bf) + Bout(Ri, Gi, Bi+Step) \times \\
& (Step-Rf) \times (Step-Gf) \times (Bf) + \\
& Bout(Ri+Step, Gi+Step, Bi) \times (Rf) \times (Gf) \times \\
& (Step-Bf) + Bout(Ri+Step, Gi, Bi+Step) \times \\
& (Rf) \times (Step-Gf) \times (Bf) + \\
& Bout(Ri, Gi+Step, Bi+Step) \times \\
& (Step-Rf) \times (Gf) \times (Bf) + \\
& Bout(Ri+Step, Gi+Step, Bi+Step) \times \\
& (Rf) \times (Gf) \times (Bf))/(Step \times Step \times Step)
\end{aligned}$$

Here, the input signals Rf, Gf, and Bf correspond to gamma-processed digital image signals Rg, Gg, and Bg, and the output signals Rout, Bout, and Gout correspond to Rt, Bt, and Gt, respectively.

Using the above arithmetic processing, the input R, G, and B signals (Rg, Gg, and Bg) are converted into output R, G, and B signals (Rt, Gt, and Bt).

The digital image signal that has undergone the three-dimensional lookup table arithmetic processing is sent to an edge synthesis processing section 206.

In the edge enhancement processing section 207, edges are detected from the digital image signal which is white-balance-processed and sent from the white balance processing section 201, and only an edge signal is extracted. The extracted edge signal is amplified by gain amplification and sent to the edge synthesis processing section 206. The edge synthesis processing section 206 adds the edge signal to the Rt, Gt, and Bt signals sent from the three-dimensional lookup table arithmetic processing section 205.

In this embodiment, the sets of matrix coefficients are prepared in advance in the matrix arithmetic processing section every 1,000 K from 3,000 K to 7,000 K. However, the color temperatures and the number of matrix coefficients prepared in advance are not limited to these. The number of sets of matrix coefficients may be increased to more accurately cope with a change in color reproduction due to a change in light source color temperature. Even when the number of sets of matrix coefficients is increased, it does not always increase the memory capacity because the data amount of one set of matrix coefficients is small, as compared to the case wherein the number of lookup tables is increased by one.

The table in the three-dimensional lookup table arithmetic processing section 205 uses 9×9×9 lattice points. However, the present invention is not limited to this. The number of lattice points may be changed in accordance with the memory capacity of the image sensing apparatus and the required color conversion accuracy. Interpolation arithmetic processing from near lattice points is not limited to equations (8), (9), and (10). Any other interpolation arithmetic processing such as tetrahedral interpolation may be used.

In this embodiment, gamma processing is executed before three-dimensional lookup table arithmetic processing. However, the order of processing operations is not limited to this, and either processing can be executed first on the basis of the relationship between the arithmetic accuracy and the buffer memory of the image sensing apparatus. For example, to decrease the buffer memory capacity, gamma processing is executed first to decrease the number of bits of the digital image signal and then, the three-dimensional lookup table arithmetic processing is executed. In this case, the number of bits of the lattice point data of the three-dimensional lookup table can also be decreased. Hence, the capacity of the three-dimensional lookup table data can be decreased. Conversely, when the three-dimensional lookup table arithmetic processing is executed before the number of bits is decreased, the conversion arithmetic processing can be executed without decreasing the arithmetic accuracy.

As described above, according to the above embodiment, digital image data (R, G, and B signals) obtained by A/D-converting image data from the CCD 102 is processed by the matrix arithmetic processing section 203 before the processing by the three-dimensional lookup table arithmetic processing section 205. For this reason, it is unnecessary to prepare a three-dimensional lookup table for each color temperature. The memory color conversion can be executed using only one three-dimensional lookup table.

In the above embodiment, a three-dimensional lookup table is used. However, the present invention can be applied not only to a three-dimensional lookup table but also an arbitrary N-dimensional (N is a positive integer) lookup table such as a one-dimensional lookup table prepared for each of the R, G, and B colors, a two-dimensional lookup table, or a four-dimensional lookup table for C, M, Y, and G.

Other Embodiment

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying a storage medium (or recording medium) which stores the program codes of software that implements the functions of the above-described embodiment to the system or apparatus and causing the computer (or CPU or MPU) of the system or apparatus to read out and execute the program codes stored in the storage medium. In this case, the program codes read out from the storage medium implement the functions of the above-described embodiment by themselves, and the storage medium which stores the program codes constitutes the present invention. The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

As described above, according to the above embodiments, the memory capacity required for the lookup table can be decreased.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus which has an image sensing element, an A/D conversion section which converts an output from the image sensing element, an image processing section which processes digital image data obtained from the A/D conversion section, a conversion section which converts the digital image data into output image data by image-processing in said image processing section, and a recording section which records the output image data to a recording medium,
   wherein said image processing section comprises a white balance processing section which executes the white balance processing in the digital image data by using white balance coefficients, a matrix arithmetic processing section which executes a matrix arithmetic processing by changing a coefficient in accordance with a color temperature of a light source, and a three-dimensional lookup table arithmetic processing section which performs a color conversion of a specific color by using a parameter according to a lattice point of three colors, and
   wherein said image processing section performs a white balance processing, a matrix arithmetic processing, and a three dimensional lookup table arithmetic processing in the order named.

2. The apparatus according to claim 1, wherein said three-dimensional lookup table arithmetic processing section outputs three output signals in correspondence with three input signals.

3. The apparatus according to claim 1, wherein said three-dimensional lookup table arithmetic processing section includes a three-dimensional lookup table formed from L X M X N (L, M, and N are arbitrary integers) lattice points and calculates data among the lattice points by interpolation arithmetic processing.

4. The apparatus according to claim 1, wherein
   the apparatus further comprises an interpolation processing section which interpolates the output from the image sensing element having a color filter comprising a plurality of colors, and
   said interpolation processing section is arranged before said three-dimensional lookup table arithmetic processing section.

5. The apparatus according to claim 1, wherein said three-dimensional lookup table arithmetic processing section stores a chrominance signal which considers a memory color of an input chrominance signal.

6. The apparatus according to claim 1, further comprising a gamma processing section, wherein
   said gamma processing section is arranged between said matrix arithmetic processing section and said three-dimensional lookup table arithmetic processing section.

7. The apparatus according to claim 1, further comprising an interpolation processing section which interpolates an output signal from the image sensing element in front of which a color filter having a plurality of colors is arranged, wherein said interpolation procesing section is arranged before said three-dimensional lookup table arithmetic processing section.

8. An image signal processing method which comprises an image processing step of A/D converting an output signal of an image sensor, which senses an image of an object, into a plurality of digital data and converting the digital data into an output image data,
   wherein the image processing step comprises a white balance processing step of executing the white balance processing to the digital image data by using white balance coefficients, a matrix arithmetic processing step of executing matrix arithmetic processing by changing a coefficient in accordance with, a color temperature of a light source, and three-dimensional lookup table arithmetic processing step of performing a color conversion of a specific color by using a parameter according to a lattice point of three colors, and
   wherein the image processing step performs a white balance processing, a matrix arithmetic processing, and a three-dimensional lookup table arithmetic processing in the order named, thereby performs the color conversion according to a color adaptability based on the color temperature in the white balance processing and the matrix arithmetic processing before the three-dimensional lookup table arithmetic processing, subsequently performs a color conversion of a specific color in the three-dimensional lookup table arithmetic processing step.

9. The method according to claim 8, wherein in the three-dimensional lookup table arithmetic processing step, three output signals are output in correspondence with three input signals.

10. The method according to claim 8, wherein the digital image data is processed in the white balance processing step before the three-dimensional lookup table arithmetic processing step.

11. The method according to claim 8, wherein the method further comprises an interpolation processing step of interpolating an output from the image sensing element having a color filter comprising a plurality of colors, and the interpolation processing step executes processing before the three-dimensional lookup table arithmetic processing step.

12. The method according to claim 8, wherein in the three-dimensional lookup table arithmetic processing step, an input chrominance signal is converted into a chrominance signal which considers a memory color of the input chrominance signal.

13. The method according to claim 8, wherein in the three-dimensional lookup table arithmetic processing step, a three-dimensional lookup table formed from L X M X N (L, M, and N are arbitrary integers) lattice points is included, data among the lattice points is calculated by interpolation arithmetic processing.

14. A program embodied on a computer-readable storage medium for causing a computer to execute an image signal processing method of claim 8.

15. A computer-readable storage medium storing a program of claim 14.

16. The method according to claim 8, further comprising a gamma processing step in which a gamma processing is performed by degrading a bit number of the image signal, wherein said gamma processing step is performed between said matrix arithmetic processing step and the three-dimensional lookup table arithmetic processing step.

17. The method according to claim 8, further comprising an interpolation processing step in which an output signal from the image sensing element, in front of which a color filter having a plurality of colors is arranged, is interpolated, wherein said interpolation processing step is performed before the three-dimensional lookup table arithmetic processing step.

* * * * *

UNITED STATES PATENT AND TRADEMARK OFFICE
CERTIFICATE OF CORRECTION

| | |
|---|---|
| PATENT NO. | : 7,236,627 B2 |
| APPLICATION NO. | : 10/613733 |
| DATED | : June 26, 2007 |
| INVENTOR(S) | : Kenji Takahashi |

Page 1 of 1

It is certified that error appears in the above-identified patent and that said Letters Patent is hereby corrected as shown below:

Column 5, Lines 8 and 9 of Equation (8), delete "Rout (Ri, Gi, +Step, Bi) x (Rf) x (Step-Gf) x (Step-Bf)"; and Column 8, Line 39, change "with," to --with--.

Signed and Sealed this

Eighteenth Day of March, 2008

JON W. DUDAS
*Director of the United States Patent and Trademark Office*